United States Patent
Hayman et al.

[11] Patent Number: 5,859,966
[45] Date of Patent: Jan. 12, 1999

[54] SECURITY SYSTEM FOR COMPUTER SYSTEMS

[75] Inventors: Kenneth John Hayman, Durham, N.C.; Michael Donovan Keene, Coral Springs, Fla.; Eric Scott Lewine, Apex, N.C.; William James Meyers, Research Triangle Park, N.C.; Jon Frederick Spencer, Raleigh, N.C.; Millard Cranford Taylor, II, Chapel Hill, N.C.

[73] Assignee: Data General Corporation, Westboro, Mass.

[21] Appl. No.: 541,636

[22] Filed: Oct. 10, 1995

[51] Int. Cl.$^6$ ......................................................... H04L 9/00
[52] U.S. Cl. ...................... 395/186; 395/188.01; 380/23; 707/1; 707/514
[58] Field of Search ............................ 395/186, 187.01, 395/188.01, 601, 183.14; 380/4, 23, 25; 354/222.5, 286.4, 286.5; 707/1, 5, 6, 9, 10, 510, 514; 711/163

[56] References Cited

U.S. PATENT DOCUMENTS

| | | | |
|---|---|---|---|
| 4,442,484 | 4/1984 | Childs, Jr. ................................ | 364/200 |
| 4,713,753 | 12/1987 | Boebert et al. .......................... | 711/164 |
| 5,121,345 | 6/1992 | Lentz ................................. | 395/186 X |
| 5,204,961 | 4/1993 | Barlow .................................... | 395/725 |
| 5,263,147 | 11/1993 | Francisco ................................ | 395/425 |
| 5,265,221 | 11/1993 | Miller ..................................... | 395/725 |
| 5,283,828 | 2/1994 | Saunders et al. ........................... | 380/4 |
| 5,335,346 | 8/1994 | Fabbio .................................... | 395/600 |
| 5,339,403 | 8/1994 | Parker .................................... | 395/425 |
| 5,355,474 | 10/1994 | Thuraisngham ....................... | 395/600 |
| 5,375,244 | 12/1994 | McNair ......................... | 395/188.01 X |
| 5,432,934 | 7/1995 | Levin et al. ............................. | 395/186 |
| 5,455,953 | 10/1995 | Russell ........................... | 395/187.01 X |
| 5,469,556 | 11/1995 | Clifton ................................ | 395/186 X |
| 5,481,700 | 1/1996 | Thuraisingham ............................ | 707/9 |
| 5,504,814 | 4/1996 | Miyahara .................................... | 380/4 |
| 5,572,673 | 11/1996 | Shurts .................................... | 395/186 |
| 5,577,209 | 11/1996 | Boyle et al. ....................... | 395/200.06 |

OTHER PUBLICATIONS

R. Wong, "A Comparison of Secure UNIX Operating System", 1990 Computer Security Applications Conference, pp. 322–333.

M. Collins et al., "Security Constraint Processing During the Update Operation in aMultilevel Secure Database Management System", 1991 Computer Security Applications Conference, pp. 23–32.

E. Fernandez et al., "A Model for Evaluation and Administration of Security in Object–Oriented Databases", IEEE Transactions on Knowledge+Data Engineering vol. 6 Issue 2, Apr. 1994, pp. 275–292.

(List continued on next page.)

*Primary Examiner*—Dieu-Minh Le
*Attorney, Agent, or Firm*—Sewall P. Bronstein; William J. Daley, Jr.

[57] ABSTRACT

A security system for a computer system imposes specific limitations on who has access to the computer system and to exactly what operations and data. Viruses are securely contained and prevented from expanding into areas where they can destroy stored programs or data. Viruses are also prevented from being introduced or executed in a large number of instances. The totality of computer functions is broken up into a set of events with an associated set of capabilities and different capabilities are assigned to each user depending on the particular job which that user is to do on the computer system. Also, security labels are placed on each data file and other system resources, and on each process. Further, a range of hierarchy/category labels (MAC labels) is assigned to each process to define a sub-lattice in which special capabilities can apply. Further, the hierarchy of labels is divided into a small number (for example 3) of regions, and a process operating in one region is generally not allowed to cross over into another region. Further, an owner of a data file is allowed to place restrictions on the file so that only users who posses certain privileges can gain access to the file.

13 Claims, 4 Drawing Sheets

OTHER PUBLICATIONS

S. Kang et al., "An Integrated Access Control in Heterogeneous Distributed Database Systems", 1992 IEEE Region 10 Conference on Technology Enabling, pp. 222–226.

Y. Oki et al., "A Design Method for Data Integrity in Object–Oriented Database Systems," 1995 Information Engineering, pp. 204–209.

Mitze Bob, "Security through software", Nov. 1989, Exe, V4, N6, p. 53(1).

Elsevier Advanced Technology Publications, "Trusted Orade 7", Computer Fraud & Security Bulletin, Mar. 1994, p. 1.

"Configurable Mandatory Access Control Subsystem", IBM Technical Disclosure Bulletin, V. 34, N. 12, May 1992 pp. 121–123.

Data General Corporation Customer Documentation, 'Using Security Features on the Trusted DG/UX™ System 093–701137–00, Jul. 1994.

Data General Corporation Customer Documentation, Managing Security on the Trusted DG/UX™ System 093–701138–00, Jul. 1994.

Data General Corporation Customer Documentation, Managing Auditing on the Trusted DG/UX™ System 093–701139–00, Jul. 1994.

FIG. 1

START OF PROGRAM
    ESTABLISH USER CAPABILITY STATE
      USER OPERATION 1
      USER OPERATION 2
      USER OPERATION 3

USER OPERATION 50
  ESTABLISH SYSTEM CAPABILITY STATE ⎫
      SYSTEM OPERATION 1 ⎬ PRIVILEGE BRACKET
  ESTABLISH USER CAPABILITY STATE ⎭
      USER OPERATION 51
      USER OPERATION 52

USER OPERATION 75
  ESTABLISH AUGMENTED USER CAPABILITY STATE ⎫
    AUGMENTED USER OPERATION 1 ⎬ PRIVILEGE BRACKET
  ESTABLISH USER CAPABILITY STATE ⎭
      USER OPERATION 76
END OF PROGRAM

SECURITY SYSTEM FOR COMPUTER SYSTEMS

FIELD OF THE INVENTION

The present invention relates to a computer system and specifically to a set of security mechanisms for a computer system. The security system precisely controls who has access to a computer system and the extent of access to the system's resources once the system is accessed.

BACKGROUND OF THE INVENTION

Within a single company or government agency, as more and more computers become connected together into large computer networks, sometimes stretching across the globe, it becomes increasingly important to protect the information on the computer system from unauthorized access. Such unauthorized access could come from outside the organization, but oftentimes it comes from within the organization. For example, a lower level employee could gain access to sensitive information concerning employee salaries or future plans of the organization.

Data General Corporation, the assignee of the present application, has been active in this field, and introduced a computer security system in August of 1994. This computer security system was tightly integrated with Data General's industry leading DG/UX Unix-based operating system and formed an integral component of the DG/UX operating system architecture. While this security system provided a certain level of control, it suffered from the following drawbacks.

One of the main problems with the prior security system is that in order to allow a user to perform an administrative action on the system, it was necessary to give this user total access to the entire system. For example, if a lower level administrative user is hired into the administration department of a large company to maintain a log of valid users, this lower level user would have to be given "super-user" access to the entire computer system, and could thus access everyone's private files and could potentially read and/or alter company sensitive data. Another problem involves viruses that can be introduced in a computer system. The prior system did not isolate viruses to protect valuable files, nor did it take positive steps to prevent viruses from occurring in the first place, even if being run by an administrative user.

SUMMARY OF THE INVENTION

The present invention is drawn to a security system for a computer system in which specific limitations are imposed on who has access to exactly what computer functions and data on the computer system. As a consequence of the specific implementation of the security system of the present invention, viruses are securely contained and prevented from expanding into areas where they can destroy stored programs or data. Viruses are also prevented from being introduced or propagating in a large number of instances.

The security system of the invention basically involves breaking up the totality of computer functions into required privileges and assigning different privileges to each user depending on the particular job which that user is to do on the computer system.

Also, security labels are placed on each data file or other system resource, and on each user process. A hierarchy of labels is created ranging from highly secret to commonly accessible and strict policies are enforced by the security system based on these labels to determine who has what type of access to which data files or other system resource. According to the invention, a range of these labels is assigned to a particular user process to define a clearance range in which the process is allowed to operate. Further, the hierarchy of labels is divided into a small number (for example 3) of regions, and a user process operating on one region is generally not allowed to access another region except in a very carefully proscribed manner.

Further, an owner of a data file is allowed to place restrictions on the file so that only users who posses certain capabilities can gain access to the file.

DETAILED DESCRIPTION OF THE PREFERRED EMBODIMENTS

Definitions

The following commonly occurring terms in this application are hereby defined as follows:

subject: an active entity of the computer system which either accesses objects or causes the system state to change (for example, a process operating on a user's behalf).

process: an actively running program, often running on a user's behalf with a set of credentials identifying who that user is and embodied with the access rights of that user.

object: a target of an operation, often a passive element of the computer system which receives and stores data (for example, a data file or a program).

operation: a request for service from the system (for example, a request to open a file for read and write access).

Capability Mechanism for Privileges

The security system of the present invention allows each process to be assigned a set of capabilities (or privileges) which it can invoke during its existence. One example of a capability is the ability to open a file to which the system would normally deny access, another is performing a restricted operation, such as shutting down the system, which is not available to regular users. This set of possible capabilities which a process may invoke when needed is called the subject permitted capability set (see 103a and 103b in FIG. 1).

Figure 1:
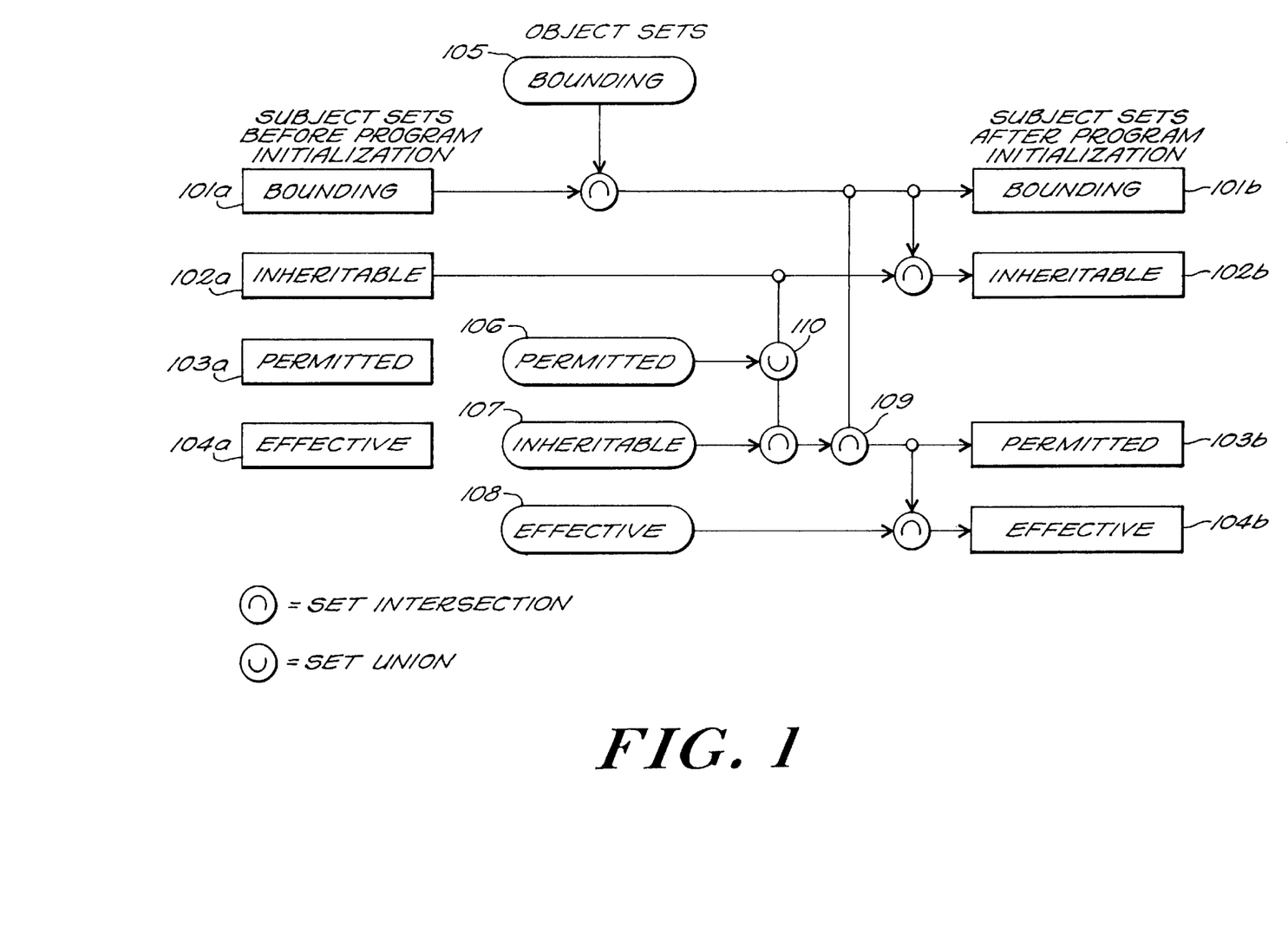
FIG. 1 shows a block diagram of capability sets and their interaction when starting a program, according to a preferred embodiment of the present invention.

Each process also has a subject effective capability set (104a and 104b) which is a subset of the permitted capability set, and is the set of capabilities that the process is currently asserting to perform operations. That is, the effective set is what the system considers when making an access control decision, while the permitted set is the upper limit of what can be included in the effective set.

Sometimes during execution of a particular program, a process' permitted capability set must be temporarily expanded to include capabilities which the user does not possess in the normal course of business. For example, the user may decide to change his password. To do this, the user must update the system files which store his password and other associated information. However, the user is not usually allowed access to these files, so the change password program must provide the ability to access these files. The program is responsible for ensuring that the extra capabilities are only used for the purpose for which they were intended, and the extra capabilities are automatically removed when the change password program terminates.

Such extra capabilities are stored as the object permitted capability set (106) on the program. The capabilities in this set are temporarily granted to a process while it is running that program. The object may also have other capability sets associated with it, which change the capabilities assigned to any process that runs the program as shown in FIG. 1. For example, when a process starts running a program, the object permitted capabilities are added to the process' permitted capabilities by a set union operator (110), and the subject permitted set is limited to the subject bounding set (discussed below) by the set intersection operator (109).

The set 102*a* is the subject inheritable capability set and represents the set of capabilities which a process can pass on to later programs run by the process. That is, the capabilities in this set are the ones that this process normally possesses, without additions from any object permitted capability set. The subject inheritable set before program initialization (102*a*) basically becomes the new subject inheritable set after the program starts (102*b*), except for Applicant's added security measures concerning a bounding set, which will be explained below. It is by this mechanism that capabilities acquired from an object permitted capability set are prevented from passing to later programs, since such enhanced capabilities are never added to the subject inheritable set.

The above structure has been included in IEEE POSIX security system in the past. Applicant has added a failsafe mechanism to the above basic structure as follows.

A subject bounding capability set (101*a*, 101*b*) is defined, and is the largest group of capabilities which may ever be acquired by a process. It is not possible for a process to increase its bounding set. As shown in FIG. 1, this set may be decreased (for example if an object bounding set is smaller than the original subject bounding set), and it serves as a limit on all other subject capability sets. This effectively reduces the process' ability to acquire capabilities and thus serves as a failsafe mechanism. For example, a user who is not authorized to perform administrative functions may be assigned a relatively small bounding set. Even if this user manages to take on an administrative identity, their bounding set will prevent them from acquiring the associated capabilities, and thus greatly reduce (or even eliminate) the potential for damage to the system.

As a further check, each executable program may also have an object bounding capability set (105) which is intersected with the subject bounding capability set (101*a*) during initialization of a program to form the new subject bounding set (101*b*) which will be effective while the program runs. Since this new bounding set also limits all the other subject capability sets, in particular the permitted and effective sets (103*b* and 104*b* respectively), this provides a mechanism for preventing a given program from being run with particular capabilities.

Event Mechanism

If the implementation were to directly check for the presence of a particular capability in the process' subject effective set whenever it wished to check for privilege, the actual security policy being enforced with respect to capabilities would have to be determined by Applicant, and individual sites would have to use that same policy. To avoid this, and allow the security policy enforced by the system to be configurable by each site to meet its individual requirements, privilege checks are done by means of "events". An event is defined as "a place in the code where a security-relevant decision is made or recorded". When the system needs to check whether a process should be allowed to perform some operation, it uses the unique event name defined for that particular privilege check to look up, in a table, the capability or capabilities which the process must possess to pass the check. By providing a mechanism for individual sites to modify the event name-to-capability table, the site can configure the system to enforce their own security policy, in addition to, or instead of, the supplied event/capability policy delivered with the security system.

Operation Bracketing

While a subject is executing an object program, the state of the process' subject effective capability set (104*b*) is changed periodically to reflect the type of operation currently being performed. Three different types of operations are defined.

Firstly, a user operation is one that should be performed with only the capabilities that are normally assigned to the user. For example, when a user requests a file be printed, accessing the requested file is a user operation. In this case, the process' effective capability set (104*b*) is set equal to its inheritable set (102*b*), since this contains the user's capabilities with no contribution from an object permitted set (106). This state is maintained as long as the program performs user operations.

Secondly, a system operation is one which the system needs to succeed if possible. For example, in the print request above, the system may copy the file to a spool area, which is normally inaccessible to users, before printing it. This copy is a system operation, since it must succeed for the file to print. In this case, the process' effective capability set (104*b*) is set equal to its permitted capability set (103*b*), which represents the user's capabilities plus any object permitted capabilities (106).

Finally, an augmented user operation is one which needs access to one or more capabilities from the object permitted set (106), but despite this is essentially a user operation. An example is setting an object permitted capability set on a program, which requires a special capability that no user or administrator normally possesses. If the program to set such a capability set decides to allow the operation, it needs to enable this particular capability, but it should not enable other object permitted capabilities it may have, since this may grant the user access to the target program which he would not normally have. In this case, the process; effective set (104*b*) is set equal to the subject inheritable set (102*b*) with the addition of particular capabilities from the subject permitted set (103*b*).

The term "bracketing" refers to enabling extra capabilities in the subject effective set (104*b*) just before a system or augmented user operation and disabling them immediately after the operation. In the prior art, bracketing was done around each user operation (even though there may have been many in a row) This involved significant analysis, to determine the capabilities required for each operation, and also computational effort, to compute and modify the effective set (104*b*) so often.

Figure 2:
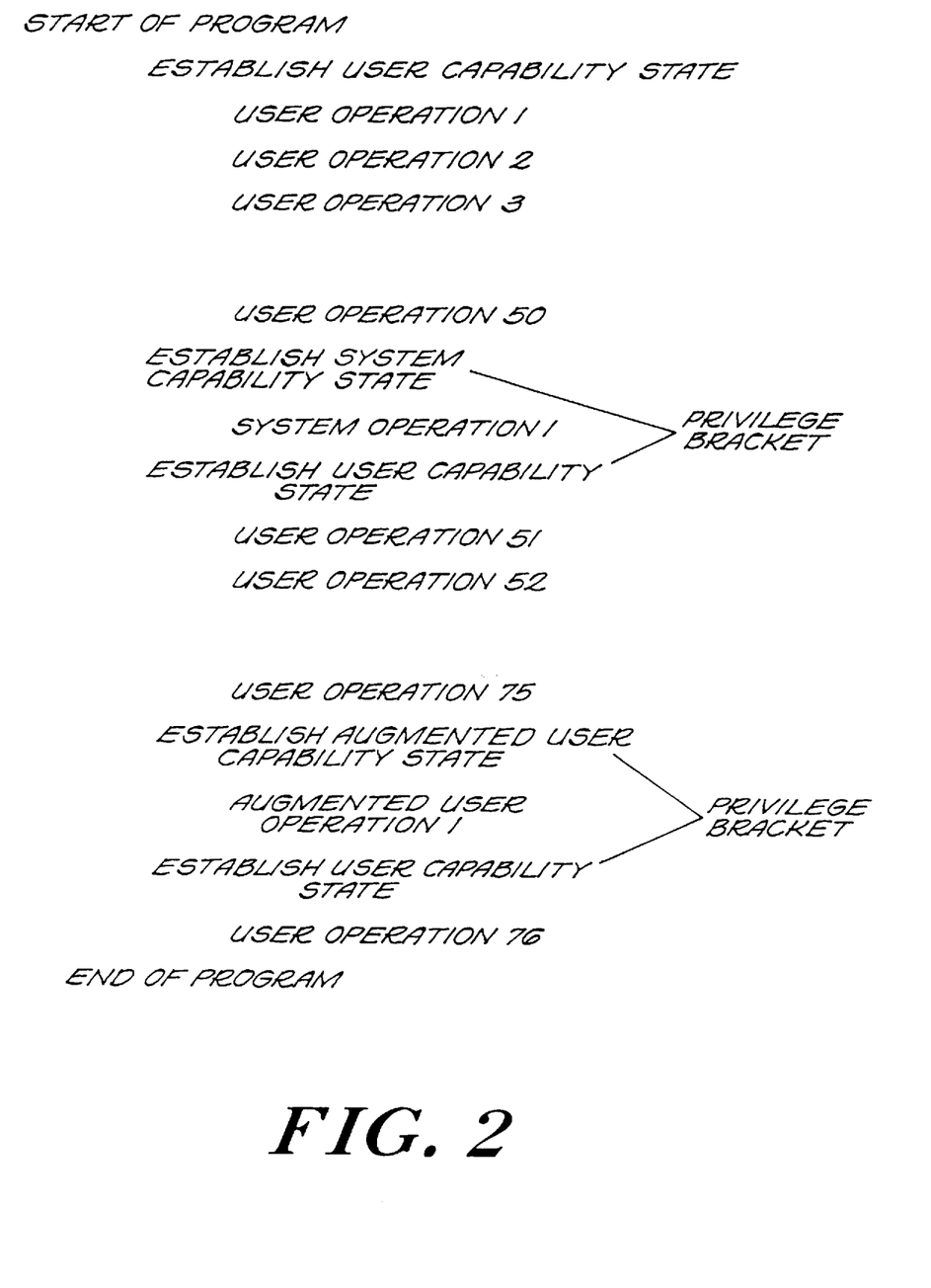
FIG. 2 illustrates operation bracketing according to an embodiment of the present invention.

According to the present invention, as shown in FIG. 2, the program establishes the effective capability state (104*b*) for user operations when it starts. This capability state is maintained as long as the program is performing user operations. When it comes time to perform a system or augmented user operation, the appropriate capabilities are enabled in the effective capability set (104*b*) immediately prior to the operation, and the user-operation capability set is reset in the effective capability set immediately after the operation. This enabling and disabling of extra capabilities before and after the system or augmented user operation form a "bracket" around the operation. In this way, the program is usually running with only the user's capabilities, except at specific places where we identify system or augmented user operations, when extra capabilities are enabled. Enabling all available capabilities for a system operation instead of just those specifically needed for that operation is acceptable, since all operations are such that having extra, unrelated, capabilities will not affect the outcome of the operation.

Since the present invention brackets much less often than the prior art, much analysis and computational effort is saved. That is, there is no need to adjust the effective capability set (104b) for each user operation. Instead, the capabilities with which the user normally runs are used.

Mandatory Access Control

The above discussion of capabilities related to the security system's ability to allow checks to be placed on a process concerning exactly which operations it can perform. According to the invention, further checks can be placed on a subject's access to particular objects.

According to well-known Mandatory Access Control (MAC) theory, labels are applied to each object and each subject. Each label consists of two components:

1. a hierarchy component, which is ordered and denotes a level of sensitivity (e.g., unclassified, secret, top secret, etc.); and
2. a category set component, which is non-ordered and denotes the area(s) of interest (e.g., marketing, research-and-development, personnel, etc.).

These MAC labels form a mathematical lattice. An example of such a label is "Secret:(SuperCar, Marketing)". This label refers to an object (e.g., a data file containing market research information) which is at the "Secret" level of sensitivity and relates to both the "SuperCar" and "Marketing" areas of interest.

A first label dominates (i.e., is higher than) a second label if 1. the hierarchical component of the first label is greater than or equal to the hierarchical component of the second label and
2. the category set of the second label is a subset (i.e., is contained within) the category set of the first label.

Thus, given two labels, the first may dominate the second, the second may dominate the first, each may dominate the other (in which case the two labels are equal), or neither may dominate the other (in which case the labels are said to be "incomparable").

A subject can read an object when the subject's label dominates the object's label (including the case where the labels are equal). This is call "read-down". A subject can write to an object when the object label dominates the subject label, which is called "write-up".

The present invention implements a stricter base policy of "read-down, write-equal", where a subject can write to an object only if the subject and object labels are equal.

MAC Ranges

In the prior art, a process running at a particular MAC label could only read an object with a label dominated by the process' label. If it were desired to give a user more access than this base policy allowed, the user's process would had to be granted total access to all objects in the computer system. In the UNIX operating system, such a user is known as a "superuser" (or "root"). In order to perform one restricted operation, a user had to be given the ability to perform all restricted operations. This is typically highly undesirable in practice.

Figure 3A:
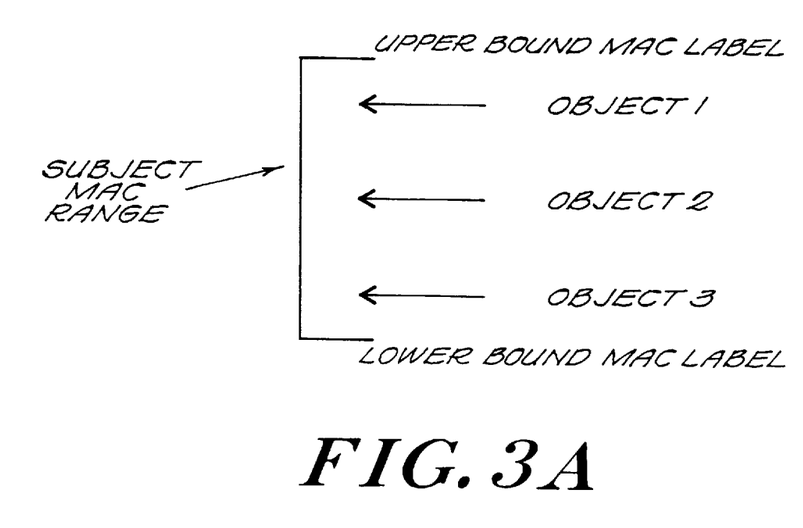
FIGS. 3A and 3B illustrate MAC ranges on process and objects respectively, according to embodiments of the present invention.

Applicant has overcome this problem by a combination of the capability mechanism described above and assigning a MAC range (a range of MAC labels) to a process (in addition to the process' MAC label). As shown in FIG. 3A, the range has an upper bound (the highest MAC label in the range) and a lower bound (the lowest MAC label in the range), and the upper bound dominates the lower bound. Such a MAC range forms a sublattice of the entire MAC lattice.

The capability mechanism provides capabilities which allow a process to override the basic system MAC policy when accessing objects with labels within the process' MAC range. For example, a process' capabilities can be configured to allow write access to any object whose MAC label is higher than the process' label but still within the process' MAC range ("write-up-within-range"). Other capabilities allow "read-up-within-range" and "write-down-within-range", which have definitions similar to the above.

Applicant's MAC ranges, combined with the capability mechanism, thus allows a user to be given increased access to a well-defined set of objects (i.e., those with MAC labels within the process' MAC range) without giving that user any increased access to other objects on the system.

Figure 3B:
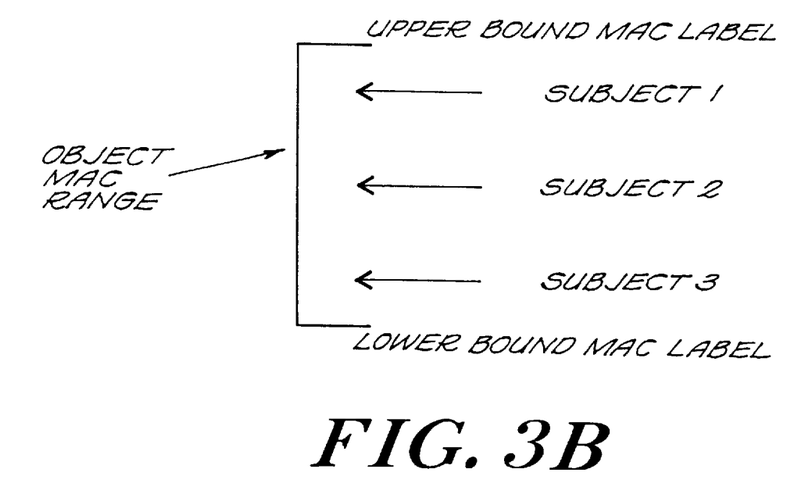

In addition to the above embodiment (see FIG. 3B), a MAC range can be defined with respect to a particular object. As long as the subject's MAC label is in between the upper and lower bounds of the object's MAC range (each of subjects 1, 2 and 3 in FIG. 3B), it is granted write-only access to the object. Read access requires that the subject's MAC label dominate the upper bound of the object's MAC range. Read/write access is thus only granted to a process whose MAC label is equal to the upper bound of the object's range.

This way, a range of users at various MAC labels can be allowed to write to an object (e.g., a log file in which users record daily transactions) without necessarily giving them the ability to read what others have written.

MAC Regions

The basic MAC policy (read-down, write-equal) has been found by Applicant to be limiting and to result in various problems.

Firstly, if an administrator is performing an administrative action, he/she is able to "read down" to any MAC label below the label of their process. Many administrative processes are typically run in the upper portion of the MAC lattice, so that regular (non-administrative) users cannot access administrative objects. Thus if a low-level user (e.g., a high-school student) is given a limited administrative role (such as adding and removing users in a large company which gains and loses many employees each month), that user would be able to access anything dominated by their administrative MAC label. As an example, the low-level administrative employee could gain access to the electronic mailboxes of the senior company officials.

Secondly, a program run by a user may contain malicious code, such as a virus, which could modify or destroy other programs and files on the system. If an administrator runs such a program, the system executables may be modified, and may perform unauthorized actions when later run by other users, such as disclosing information intended to be kept secret.

Figure 4:
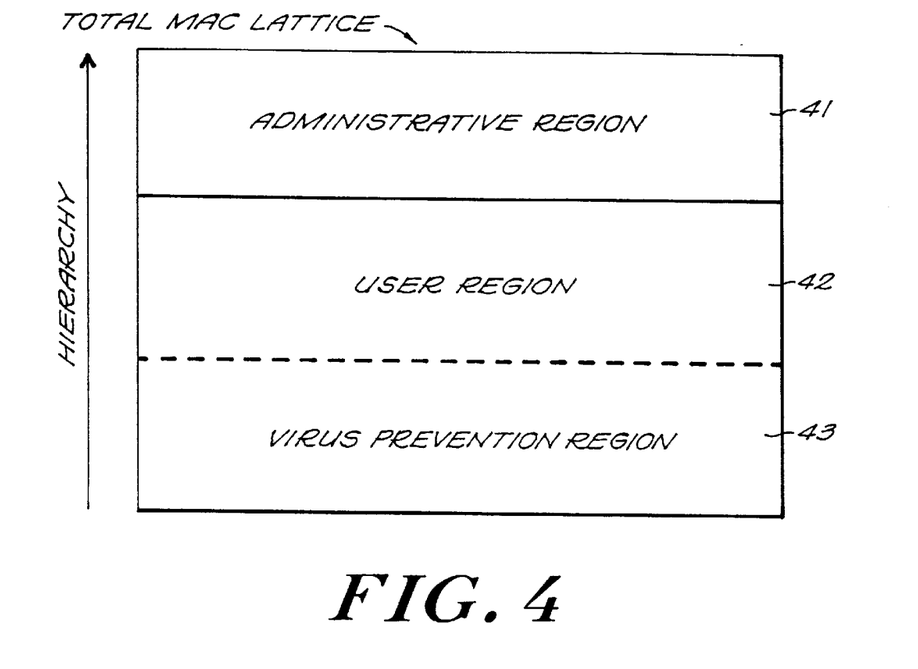
FIG. 4 illustrates MAC regions according to an embodiment of the present invention.

Applicant has solved these problems by dividing the totality of MAC hierarchies into a small number of distinct and non-overlapping regions. For example, as shown in FIG.

4, three regions can be used: an administrative region (41), a user region (42) and a virus prevention region (43). The administrative region is located at the highest MAC hierarchies, the virus prevention region is at the lowest MAC hierarchies, and the user region is in between. Effective policy restrictions are placed on processes in one region accessing objects in another region so that problems such as described above are overcome.

For example, a process running with a MAC label in the administrative region gains access to objects in the user and virus prevention regions not though its (administrative) MAC label but rather through the upper bound of its MAC range (which by definition is in the user region). By giving an administrator a MAC range whose upper limit is at the bottom of the user region, it is thus possible to prevent the administrator from accessing most or even all of the files in the user region.

Likewise, a special capability is required to write to the virus prevention region, and this capability is typically granted only to the administrator responsible for installing software, not to other administrators or users. The system executables are stored in the virus prevention region so they gain the benefit of this write-protection. When a process runs a program, a copy of the program is made into memory allocated to that process. If the program contains malicious code which attempts to modify any objects in the virus prevention region (where all system executables and many other system files are placed), access will be denied. The virus is thus effectively contained and is unable to spread and do further damage.

There are no capabilities which allow a process to override the restrictions on access to objects in different MAC regions. This allows for the containment of administrative authority by limiting the access of various administrators to only those objects they need to get their job done.

Trusted Facility Mode

Further to the MAC regions aspects discussed above, the present invention provides extra security and extra virus protection in that a process is only allowed to execute a program if that program is stored in the virus prevention region (43). This can be achieved, for example, by performing a check on each program before it is executed to make sure the software resides in the virus prevention region (43). The virus prevention region (43) is thus the only place which can contain potentially executable programs for processes running in Trusted Facility Mode. This provides an expanded amount of control because the system administrators can decide exactly which programs will be made available to users.

With the Trusted Facility Mode aspect of the invention, users are unable to, for example, download and run programs from the Internet (using e.g., File Transfer Protocol). External programs are a common source of viruses. Therefore, by preventing external programs from being run on the computer system, viruses can be prevented in a large number of instances.

Trusted Facility Mode also helps to prevent administrative abuse by preventing administrators from running programs that are not officially installed in the virus prevention region.

Multilevel Directories

When creating a file system object, a subject is actually writing to a directory listing each file system object which it contains. According to general MAC policy, a subject must be at the same MAC level as an object to write to it. In this case, the object is the directory, which is at a particular MAC level. Certain UNIX directories (such as /tmp, /var/mail, etc.) are "common" directories which many users should have access to. Thus, when general MAC policy is in place, it is not possible for subject not at the MAC level of the directory to write thereto.

The present invention uses Multilevel Directories in order to accept information into a directory from subjects at different MAC levels. A hidden subdirectory at the correct MAC level is dynamically created for the information being written. Each hidden directory exists at separate MAC level, and a hidden directory is created for each subject MAC level desiring to write to the Multilevel Directory family. Such hidden directories are not normally visible to any subjects, unless the subject carries a special capability designed for this purpose.

Text Attributes

Figure 5:
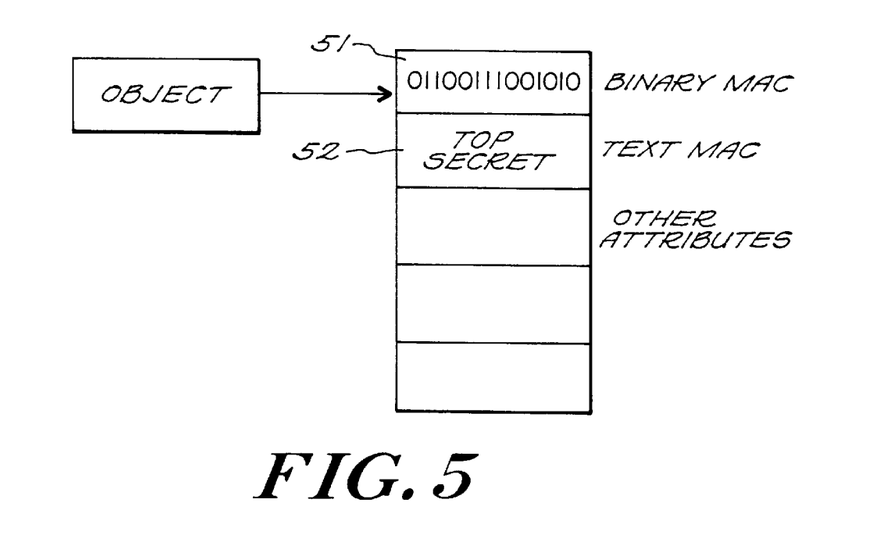
FIG. 5 illustrates Text Attributes according to an embodiment of the present invention.

When the hierarchical and categorical components of MAC labels are stored, they are generally stored as binary values called binary security attributes. According to an aspect of the invention, text attributes (52) are stored alongside their corresponding binary security attributes (51). Then, if it is desired to change the binary security attributes associated with a text attribute (e.g., if the hierarchical component of a label is to be changed from "secret" to "top secret") the system searches for the text attributes and when it finds it, the binary security attribute stored alongside the found text attribute is changed.

This creates the advantage of not having to search for the binary attribute, which avoids finding equivalent binary values that are not associated with the text attribute and should not change simply because the binary value associated with the text attribute has changed. If such binary values were changed, important data elsewhere on the system could be lost or compromised.

Capability Access Control

The security system of the invention provides an additional level of control in which the owner of an object is allowed to place a desired amount of protection on the object, to protect the object from unauthorized access.

Specifically, the owner of an object assigns a set of capabilities (a required capability set) to an object. In order for a process to access the object (e.g., to obtain read/write access to a data file), the process must contain, in its effective capability set, all of the capabilities which the object owner has assigned to the object required capability set.

An important aspect of Capability Access Control (CAC) is that no overrides to this policy are possible. That is, there is no way that special capabilities can be assigned to or acquired by an process to override the CAC policy. Therefore, even high level administrators must have the entire required capability set to gain access to a CAC protected object. This provides a high level of protection against administrative abuse.

Session Monitor

The Session Monitor is the part of the security system which controls the manner in which a user or administrator initially gains access to the computer system, and the manner in which a user or administrator changes from their current mode of access to a different mode (for example, from user to administrator). The Session Monitor also participates in enforcing the security system's containment policy by limiting both user and administrator security credentials, no matter what their current mode of access, to maximum values established upon the said user's or administrator's initial access to the system.

The Session Monitor has been designed to be extensible, in the sense that the owner of the security system can incorporate their own software to change access mode of a user or administrator, or to process authentication transactions before allowing a user or administrator access to the system, in either an existing mode or a new mode implemented by the said software. In either case, integration with the supplied security system is accomplished by writing the new software to function against interfaces delivered as part of the security system, following policy guidelines also included with the security system. After installation of said new software, administration of the new access mode function(s) and/or the new authentication function(s) is accomplished in the same way, using the same mechanisms, as administration of the access modes and authentication method(s) delivered with the original security system.

The Session Monitor has also been designed around the concept that different access modes might require different credentials and different authentication procedures. Consequently any one of the supported access modes, either originally delivered with the security system or written and installed by the owner, may require a different series of authentication steps than any other of the said access modes, including authentication steps that are processed using software written and installed by the owner of the said security system. Similarly, the Session Monitor may assign any supported access mode, either originally delivered with the security system or written and installed by the owner, a different set of security credentials. However, the security credentials available to any user, regardless of access mode, are limited to maximum values established upon the said user's (or administrator's) initial access to the system.

Administrative Set-Permitted Capability Set

One instance of the security system's general containment policy is the manner in which the invention controls an administrator's ability to assign permitted capability sets to programs and other objects. When the said administrator first accesses the system (which access must be as an ordinary user), the Session Monitor identifies a maximum set of capabilities that the said user will be allowed to assign as permitted capabilities on any object throughout the term of the said access to the system, notwithstanding any changes in the mode of said access. When the said user changes their access mode to become an administrator, the Session Monitor preserves this limit in the credentials of their new access mode; and when the said operation is attempted, the system permits only the said capabilities to be so assigned, without regard to the role or access mode in which the said user is currently executing.

The advantage over-prior art is that in the present invention different users may be assigned different containment limits, which apply to any action the said users attempt without regard to their current access mode, including administrative modes. Thus the actions allowed by administrators can be controlled to a per-user granularity, which feature can be used to reduce the risks associated with system administration.

Reference Monitor

The Reference Monitor is the entity that mediates all requests for access to an object by a subject, and thus controls whether, and to what extent, the subject is granted access to the object. Such a Reference Monitor can be found in the earlier version of Data General's security system discussed in the Background of the Invention above. The various subject-to-object access policies described above can be implemented by storing various policy data in an Information Security Policy Table database, which is maintained as part of the Reference Monitor.

The Information Security Policy Table database contains policy modules which the Reference Monitor must invoke to check access. This table can be configured when the system software is first installed, to meet the specific security policy of the specific computer system. Further, the table can be altered when the security policy of the enterprise changes.

The database discussed above is stored, along with the operating system software, on a computer system storage medium such as a hard drive, CD-ROM or semi-conductor based memory. The computer system continually accesses this database to determine and set the security policy.

The present invention is not limited by the above-described embodiments, but only by the spirit and scope of the appended claims.

What is claimed is:

1. A security control method for a computer system, said method comprising steps of:
    (a) storing in a database of said computer system and in the computer system itself security policies;
    (b) continually accessing said database and the computer system during use thereof in order to determine the specific policy stored therein with respect to a particular subject presently using the computer system; and
    (c) allowing the subject access to said computer system only to the extent allowed by the results of step (b);
    wherein said database contains:
        a subject inheritable capability set containing a plurality of capabilities which a subject can pass on to future program executions,
        a subject bounding capability set containing an absolute upper limit on all capabilities assigned to a subject, and
        further wherein, according to the security policy stored in said database and the computer system, a subject is prohibited from passing on capabilities in its subject inheritable capability set when such capabilities are not included in the subject's bounding capability set.

2. The security control method of claim 1, wherein said database and computer system contains Mandatory Access Control labels for each subject and each object, said labels being arranged in a hierarchical lattice, and
    further wherein, according to the security policy stored in said database and computer system, a range of Mandatory Access Control labels is assigned to a subject and that subject has access to objects having Mandatory Access Control labels within the range.

3. The method of claim 2 wherein according to the security policy stored in said database and computer system, a subject assigned a range of Mandatory Access Control labels is further assigned a set of capabilities which allow it additional accesses to objects having Mandatory Access Control labels within the range.

4. The security control method of claim 2, wherein said hierarchical lattice is divided into a plurality of distinct and non-overlapping regions.

5. The security control method of claim 1, wherein said database and computer system contains Mandatory Access Control labels for each subject and each object, said labels being arranged in a hierarchical lattice, and
    further wherein, according to the security policy stored in said database and computer system, a range of Mandatory Access Control labels is assigned to an object and that object is accessible to any subject having a Mandatory Access Control label within the range.

6. The security control method of claim 5, wherein said hierarchical lattice is divided into a plurality of distinct and non-overlapping regions.

7. The security control method of claim 1, wherein said database and computer system contains a required capability set containing a plurality of capabilities for an object and an effective capability set containing a plurality of capabilities for each subject, and further wherein, according to the security policy stored in said database and computer system, a subject is allowed to access an object if the subject's effective capability set includes all of the capabilities in the object's required capability set.

8. The security control method of claim 1, wherein said database and computer system contains Mandatory Access Control labels for each subject and each object, said labels being arranged in a hierarchical lattice, with higher level labels being assigned to an administrative region, intermediate level labels being assigned to a user region and lower level labels being assigned to a virus prevention region, and further wherein, according to the security policy stored in said database and computer system, a subject operating in one Mandatory Access Control region is not allowed to access an object in another region unless a special capability or a special set of Mandatory Access Control attributes is assigned to the subject.

9. The security control method of claim 8, wherein according to the security policy stored in said database and computer system, subjects are only allowed to run programs which have Mandatory Access Control labels in said virus prevention region.

10. The security control method of claim 1, wherein said database and computer system contains Mandatory Access Control labels for each subject and each object, said labels being arranged in a hierarchical lattice with each label having a binary security attribute, and further wherein, said database contains a text attribute for each Mandatory Access Control label, said text attribute being stored alongside the respective binary security attribute for each label.

11. The security control method of claim 1, wherein said database contains a plurality of authentication mechanisms which a user must correctly respond to before being allowed initial access to the computer system, and further wherein, each user can be assigned a different set of authentication mechanism which the user must correctly respond to before being allowed initial access to the network.

12. The security control method of claim 1, wherein said database contains an administrative capability set containing a plurality of capabilities, each capability being a different type of privilege which an administrator can confer upon subjects, and further wherein, according to the security policy stored in said database and computer system, an administrator is prohibited from assigning a subject a capability which is not in the administrator's administrative capabilities set.

13. A method of executing a program on a computer, said program including user mode operations which a user specifically requests the computer to perform and which the user usually has the capability to perform, and system mode operations which the system performs for system maintenance or integrity purposes, and augmented user operations in which the system provides a few select capabilities to enhance those provided by the user; said method containing steps of:

setting a subject's effective capability set equal to the subject's inheritable capability set during the time in which a sequential string of user mode operations is being executed by said computer;

setting a subject's effective capability set equal to its permitted capability set during the time in which a string of sequential system mode operations is being executed by said computer; and setting a subject's effective capability set equal to its inheritable capability set during the time in which a subsequent sequential string of user mode operations is being executed by said computer;

setting a subject's effective capability set equal to its inheritable capability set plus a well-defined set of augmenting capabilities during the time in which a string of sequential augmented user mode operations is being executed by said computer.

* * * * *